(12) United States Patent
Bramley, Jr. et al.

(10) Patent No.: US 11,657,138 B2
(45) Date of Patent: May 23, 2023

(54) SIGNED CHANGE REQUESTS TO REMOTELY CONFIGURE SETTINGS

(71) Applicant: Hewlett-Packard Development Company, L.P., Spring, TX (US)

(72) Inventors: Richard Alden Bramley, Jr., Mansfield, MA (US); Dallas M. Barlow, Spring, TX (US); Patrick Lee Gibbons, Spring, TX (US); Adrian John Baldwin, Bristol (GB); Tevin Jaupaul Richards, Spring, TX (US); Robert Stephen Craig, Spring, TX (US); Valiuddin Ali, Spring, TX (US); Jeffrey Kevin Jeansonne, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/054,197

(22) PCT Filed: Feb. 28, 2019

(86) PCT No.: PCT/US2019/019963
§ 371 (c)(1),
(2) Date: Nov. 10, 2020

(87) PCT Pub. No.: WO2020/176093
PCT Pub. Date: Sep. 3, 2020

(65) Prior Publication Data
US 2021/0382979 A1  Dec. 9, 2021

(51) Int. Cl.
*G06F 21/00* (2013.01)
*H04L 29/06* (2006.01)
(Continued)

(52) U.S. Cl.
CPC .......... *G06F 21/44* (2013.01); *G06F 9/44505* (2013.01); *H04L 9/14* (2013.01)

(58) Field of Classification Search
CPC .... G06F 9/44505; G06F 21/44; G06F 21/572; H04L 9/14
See application file for complete search history.

(56) References Cited

U.S. PATENT DOCUMENTS

| 5,844,986 A | 12/1998 | Davis |
| 6,324,644 B1 | 11/2001 | Rakavy et al. |

(Continued)

FOREIGN PATENT DOCUMENTS

| EP | 1813052 B1 | 6/2013 |
| WO | WO-1996027155 A2 | 9/1996 |
| WO | WO-2011047063 A1 | 4/2011 |

OTHER PUBLICATIONS

Microsoft Surface Enterprise Management Mode (https://docs.microsoft.com/en-us/surface/surface-enterprise-management-mode).

*Primary Examiner* — Philip J Chea
*Assistant Examiner* — Rodman Alexander Mahmoudi
(74) *Attorney, Agent, or Firm* — Knobbe, Martens, Olson & Bear, LLP

(57) ABSTRACT

An example computing device includes a memory accessible at startup of the computing device, a buffer, and a set of instructions. The memory stores a configuration setting that is configurable by the application of a change request. The memory also stores a first public key and a second public key. The buffer stores change requests submitted by a remote entity, including a first change request to make a first setting change and a second change request to make a second setting change. The first change request is signed by a first private key corresponding to the first public key, and the second change request is signed by a second private key (Continued)

corresponding to the second public key. The set of instructions retrieves a change request from the buffer, determines whether the change request is authenticated by a public key, and if authenticated, applies the change request.

12 Claims, 7 Drawing Sheets

(51) Int. Cl.
*G06F 21/44* (2013.01)
*G06F 9/445* (2018.01)
*H04L 9/14* (2006.01)

(56) References Cited

U.S. PATENT DOCUMENTS

| | | |
|---|---|---|
| 6,823,464 B2 | 11/2004 | Cromer et al. |
| 9,660,807 B2 | 5/2017 | Lewis |
| 2004/0025027 A1 | 2/2004 | Balard et al. |
| 2005/0055556 A1* | 3/2005 | Shiu ............... G06F 21/64 |
| | | 713/182 |
| 2005/0060581 A1 | 3/2005 | Chebolu et al. |
| 2009/0113414 A1 | 4/2009 | Hamilton |
| 2009/0227274 A1 | 9/2009 | Adler et al. |
| 2012/0011358 A1* | 1/2012 | Masone ............ G06F 21/305 |
| | | 713/153 |
| 2015/0089238 A1* | 3/2015 | Lewis ............... H04L 9/3236 |
| | | 713/183 |
| 2015/0199519 A1* | 7/2015 | Marr ............... G06F 21/577 |
| | | 726/22 |
| 2015/0242630 A1 | 8/2015 | Barkelew et al. |

\* cited by examiner

SIGNED CHANGE REQUESTS TO REMOTELY CONFIGURE SETTINGS

BACKGROUND

Computing devices, such as desktop computers, notebook computers, servers, tablet computers, and smartphones, often include firmware stored in non-volatile memory. An example of firmware includes hardware-initialization firmware, such as Basic Input/Output System (BIOS) firmware and Unified Extensible Firmware Interface (UEFI) firmware, which initializes hardware of a computing device and starts runtime services that may be used by an operating system or application executed by the computing device. Another example of firmware includes a management firmware subsystem which may perform boot protection, remote access or management services, monitor/control of device physical properties (e.g., cooling fan speed, CPU/motherboard temperature, CPU/motherboard voltage, etc.), network functionality, security functionality, copy protection, digital rights management, and similar.

Firmware may be configured to perform processes based on the selection of various firmware configuration settings for a computing device. Firmware configuration settings may be changed locally or remotely with the provision of an administrator password or other secret.

DETAILED DESCRIPTION

Figure 1:
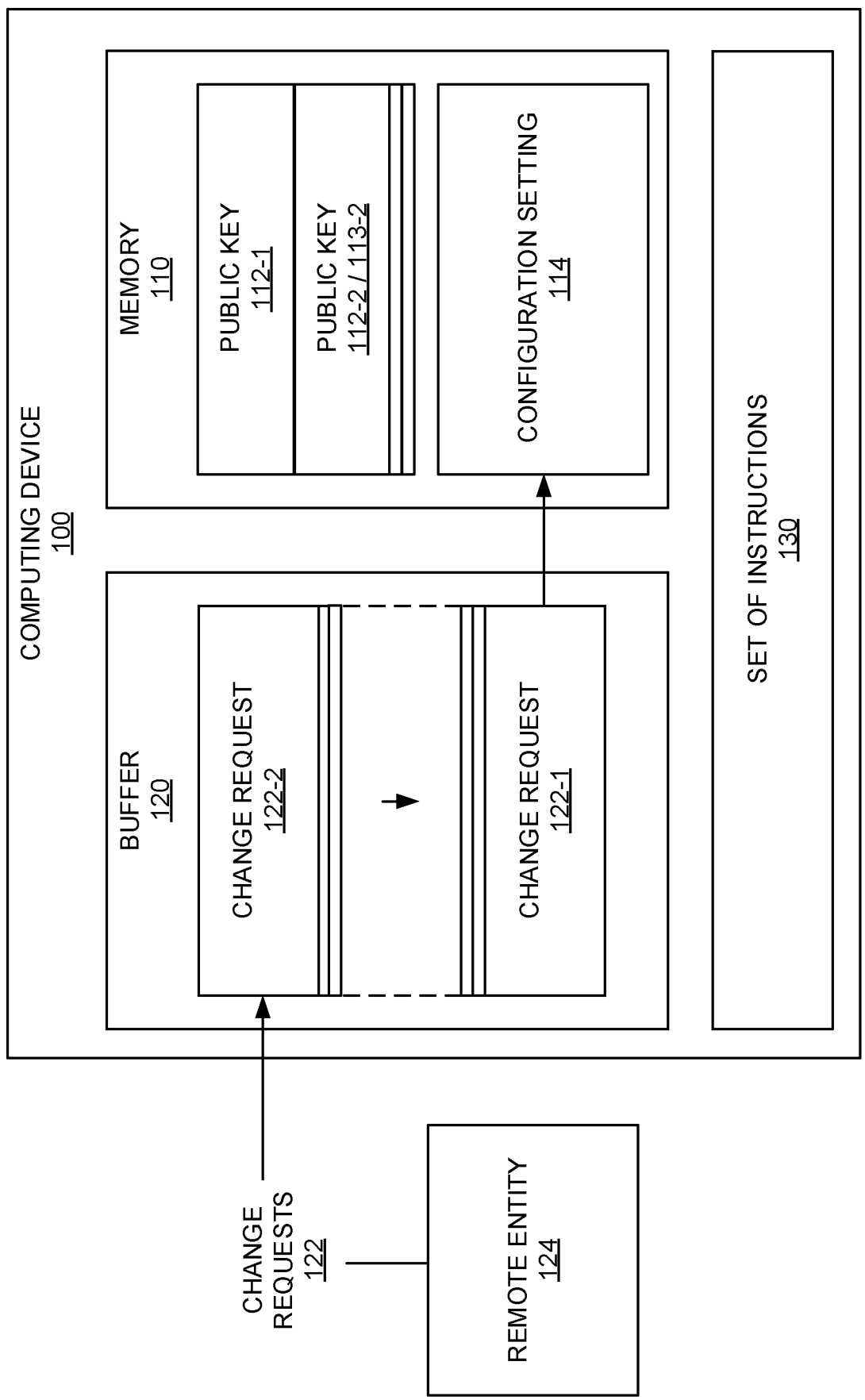
FIG. 1 is a schematic diagram of an example computing device having a configuration setting changeable by application of a change request sent by a remote entity.

An administrator may remotely change a configuration setting of a target computing device by securely transmitting to the target computing device a request to change the configuration setting. The ability to remotely configure configuration settings provides a convenient way for an administrator to manage a large number of computing devices without having to be present at each computing device when implementing a change. The remote management of configuration settings is particularly applicable to the management of hardware-initialization firmware configuration settings, whereby an administrator may submit a change request to a target computing device, which is then applied at the next startup of the target computing device.

Ensuring that the remote management of configuration settings is done in a secure manner may be achieved in various ways. For example, a request to change configuration settings may include a password or other secret for authentication by the target computing device. The request may be obfuscated by hashing or other means in a manner that may only be decoded by the target computing device. However, such techniques are prone to security breaches where, for example, an obfuscated change request is intercepted, decoded, and manipulated to maliciously alter the settings on the target computing device. An example of another approach is to install a program on the target computing device to handle remotely transmitted change requests. However, the request-handling program at the target computing device may inhibit backward compatibility with other configuration management systems. For example, a program to handle firmware configuration settings change requests may lack backward compatibility with other firmware management systems which are configured to interface with the firmware to change only one setting at a time.

A change request may be secured by public key cryptography to mitigate the risk, and the consequences of, interception of the settings change request. A change request may be to request a single change of a configuration setting so that backward compatibility with legacy configuration management systems is maintained. Thus, the remote management of configuration settings may be managed and secured at the individual setting level.

An example computing device may include a memory accessible at startup of the computing device, a buffer, and a set of instructions. The memory may store a configuration setting that is configurable by the application of a change request. The memory may also store a first public key and a second public key. The buffer may store change requests submitted by a remote entity, including a first change request to make a first setting change and a second change request to make a second setting change. The first change request may be signed by a first private key corresponding to the first public key, and the second change request may be signed by a second private key corresponding to the second public key. The set of instructions retrieves a change request from the buffer, determines whether the change request is authenticated by a public key, and if authenticated, applies the change request.

FIG. 1 is a schematic diagram of such an example computing device 100. The computing device 100 may be a desktop computer, server, notebook computer, tablet computer, smartphone, or similar device.

The computing device 100 includes a memory 110, a buffer 120, and a set of instructions 130. The computing device 100 may include other components, not illustrated for sake of clarity, such as a processor, user interface device (e.g., keyboard, display, touchscreen, etc.), network interface, mass storage device (e.g., hard drive, solid-state drive, etc.), power supply, and the like.

The memory 110 is a non-transitory computer-readable medium that includes non-volatile memory, such as Electrically Erasable Programmable Read-Only Memory (EEPROM), flash memory, or similar type of memory that is capable of preserving its content without external power. The memory 110 is accessible at startup of the computing device 100. The memory 110 may store hardware initialization (e.g. BIOS/UEFI) firmware to initialize the computing device 100.

The memory 110 stores a configuration setting 114. The configuration settings a 114 is configurable by application of a change request 122, as discussed herein. The memory 110 further stores public keys 112 such as public key 112-1 and public key 112-2. The public keys 112 are to authenticate change requests 122. The configuration setting 114 may include a firmware configuration setting, such as hardware-initialization firmware configuration setting or management firmware subsystem configuration setting.

The buffer 120 stores change requests 122, such as change requests 122-1 and 122-2, submitted by a remote entity 124. A remote entity may include a computing device controlled by an administrator. Each change request 122 is to make a single change to the configuration settings 114 to maintain backward compatibility with configuration management systems. For example, the change request 122-1 may be to make a first setting change, and the change request 122-2 may be to make a second setting change. The memory 110 may store additional configuration settings. The first and second setting changes may be directed to changing the same setting or to different settings.

Each change request 122 is signed by a private key corresponding to a public key 112. Further, different change requests 122 may be signed by different private keys. For example, the change request 122-1 is signed by a private key corresponding to the public key 112-1, and the change request 122-2 is signed by a private key corresponding to the public key 112-2. Thus, different change requests 122 may be encrypted differently so that a security breach of one change request 122 will not necessarily compromise the security of other change requests 122. Further, some configuration settings 114 may be changeable only by a change request 122 which is authenticated by a particular public key corresponding to a particular private key, thereby enabling the remote management of configuration settings at the individual setting level. For example, some configuration settings may be changeable by a first group of administrators who have access to a particular set of private keys, while other configuration settings are changeable by another group of administrators who have access to a different set of private keys.

Some change requests 122 may be signed at the remote entity 124. Other change requests 122 may be submitted to the computing device 100 from other remote entities, which may be controlled by other administrators, not shown. In some examples, private keys for signing change requests 122 may be stored directly at the remote entity 124 or at the other remote entities which transmit other change requests 122. In some examples, private keys for signing change requests 122 may be securely stored remote from the computing device 100 and remote from the remote entity 124, such as at a centralized management server, securely accessible by the remote entity 124 and other remote entities.

The set of instructions 130 may be stored in a non-volatile memory of the computing device 100, such as memory 110, or another memory. The set of instructions 130 includes instructions to retrieve a change request 122 from the buffer 120, determine whether the retrieved change request 122 is authenticated by a public key 112, and if authenticated, apply the change request 122 to the configuration setting 114. For example, the set of instructions 130 may retrieve change request 122-1, determine whether change request 122-1 is authenticated by public key 112-1, and if authenticated, apply the change request 122-1 to the configuration setting 114. Further, the set of instructions 130 may then retrieve change request 122-2, determine whether change request 122-2 is authenticated by public key 112-2, and if authenticated, apply the change request 122-2 to the configuration setting 114.

In some examples, the memory 110 may also store a public key-encryption-key (public KEK) corresponding to a private key-encryption-key (private KEK) accessible by the remote entity 124. The remote entity 124 may issue a command to the computing device 100 to swap an existing public key 112 with a replacement public key, the command being secured by the private KEK. Thus, a particular public key 112 may be replaced where it is determined that the particular public key 112 has been compromised, phased out, or is otherwise to be replaced. For example, public key 112-2 may be replaced by replacement public key 113-2. Secure replacement of public keys at the level of particular configuration setting further facilitates the remote management of configuration settings at the individual setting level. For example, only the public keys 112 associated with a particular administrator may be replaced. In some examples, replacement of a public key 112 at the computing device 100 may be facilitated by the installation of a Physical Presence Interface (PPI) usable by an administrator to configure the computing device 100 to accept replacement public keys. Corresponding private KEKs may be stored at the remote entity 124, or remote from the computing device 100 and remote from the remote entity 124, such as at a centralized management server, securely accessible by the remote entity 124 and other remote entities.

In some examples, the set of instructions 130 may further include instructions to verify integrity of a public key 112 prior to accepting change requests 122 based on signature verification. Upon determining that a public key 112 lacks integrity, the set of instructions 130 may cause the computing device 100 to revert to accepting unsigned change requests protected by passwords. Further, in examples in which the memory 110 stores a public KEK, the set of instructions 130 may further include instructions to verify the integrity of the public KEK before accepting change requests 122 based on signature verification. Upon determining that a public KEK lacks integrity, the computing device 100 may revert to accepting unsigned change requests protected by passwords.

Figure 2:
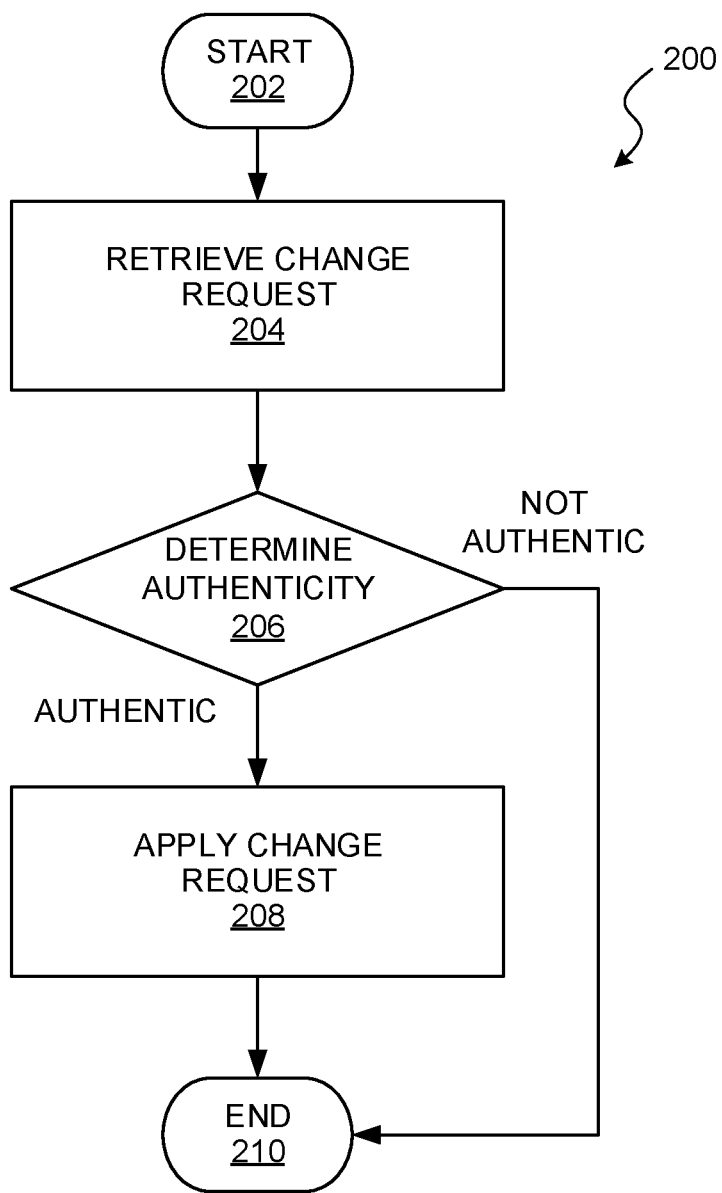
FIG. 2 is a flowchart of an example method to apply a change request sent by a remote entity to change a configuration setting of a target computing device.

FIG. 2 is a flowchart of an example method 200 to apply a change request sent by a remote entity to change a configuration setting of a target computing device. The method 200 may be performed by a device or system described herein, such as a computing device which has configuration settings to be changed by application of change requests, including the computing device 100 of FIG. 1, or other computing device. The method 200 may be performed by any of the devices and systems described herein. The method 200 may be embodied by a set of executable instructions that may be stored in a non-transitory computer-readable medium, and may be executed to cause a processor of a computing device to perform the method 200. The method 200 may be executed at startup of the target computing device. The method 200 begins at block 202.

At block 204, a change request is retrieved. The change request is to change a configuration setting at the target computing device. The change request includes a signature to secure the change request. The signature is generated using a private key selected from a plurality of private keys.

At block 206, authenticity of the change request is determined. The authenticity of the change request is determined using a public key corresponding to the private key used to sign the change request. The public key is stored on the target computing device. If the change request is determined to be not authentic, the method is ended at block 210.

In response to determining that the change request is authentic, the change request is applied at block 208. The change request changes a configuration setting of the target computing device.

Figure 3:
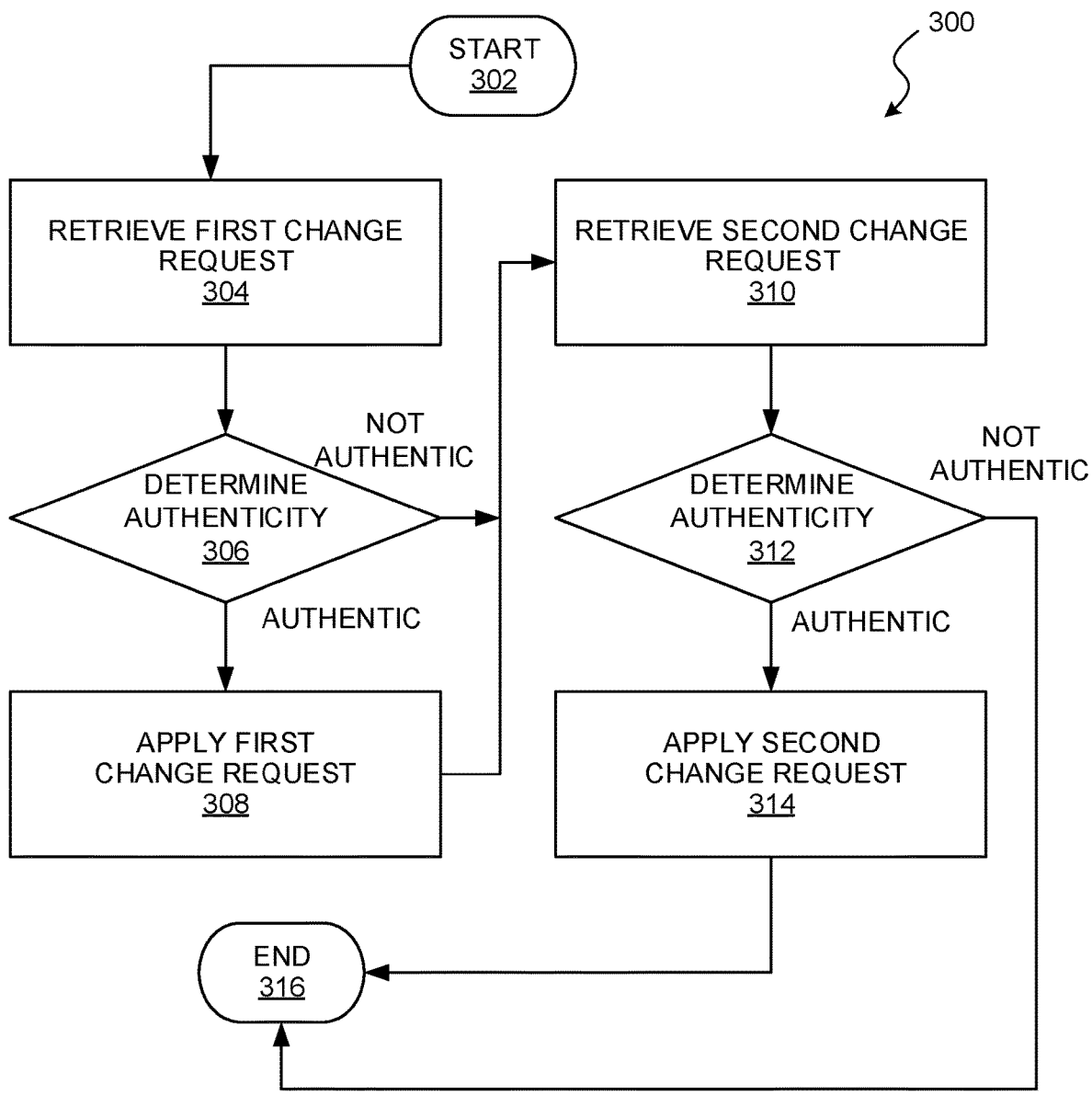
FIG. 3 is a flowchart of an example method to apply a sequence of change requests to change configuration settings of a target computing device.

FIG. 3 is a flowchart of an example method 300 to apply a sequence of change requests to change configuration settings of a target computing device. The method 300 may be performed by a device or system described herein, such as a computing device which has configuration settings to be changed by application of change requests, including the computing device 100 of FIG. 1, or other computing device. The method 300 may be embodied by a set of executable instructions that may be stored in a non-transitory computer-readable medium, and may be executed to cause a processor of a computing device to perform the method 300. The method 300 may be executed at startup of the target computing device. The method 300 begins at block 302.

At block 304, a first change request is retrieved. The first change request is to change a first configuration setting at the target computing device. The first change request may be sent from a first remote entity.

The first change request includes a signature generated using a first private key selected from a plurality of private keys.

At block 306, authenticity of the first change request is determined. The authenticity of the first change request is determined using a first public key corresponding to the first private key. The first public key is stored on the target computing device.

In response to determining that the first change request is authentic, the first change request is applied at block 308. The first change request changes a first configuration setting of the target computing device.

If the first change request is determined to be not authentic, block 310 is executed, where a second change request is retrieved. The second change request is to change another configuration setting at the target computing device. The second change request may be sent from the first remote entity or from another remote entity.

In some examples, the configuration setting to be changed by the second change request may be different from the first configuration setting. In other examples, the second configuration setting may be the same setting as the first configuration setting.

The second change request includes a signature generated using a second private key selected from the plurality of private keys. The second private key is different from the first private key.

At block 312, authenticity of the second change request is determined. The authenticity of the second change request is determined using a second public key corresponding to the second private key. The second public key is stored on the target computing device. If the second change request is determined to be not authentic, the method is ended at block 316.

In response to determining that the second change request is authentic, the second change request is applied at block 314. The second change request changes a configuration setting of the target computing device.

The method 300 may be performed in sequences other than the sequence shown. For example, the first and second change requests may each be retrieved before the authenticity of either change request is determined. As another example, the authenticity of the first and second change requests may each be determined before either change request is applied.

Figure 4:
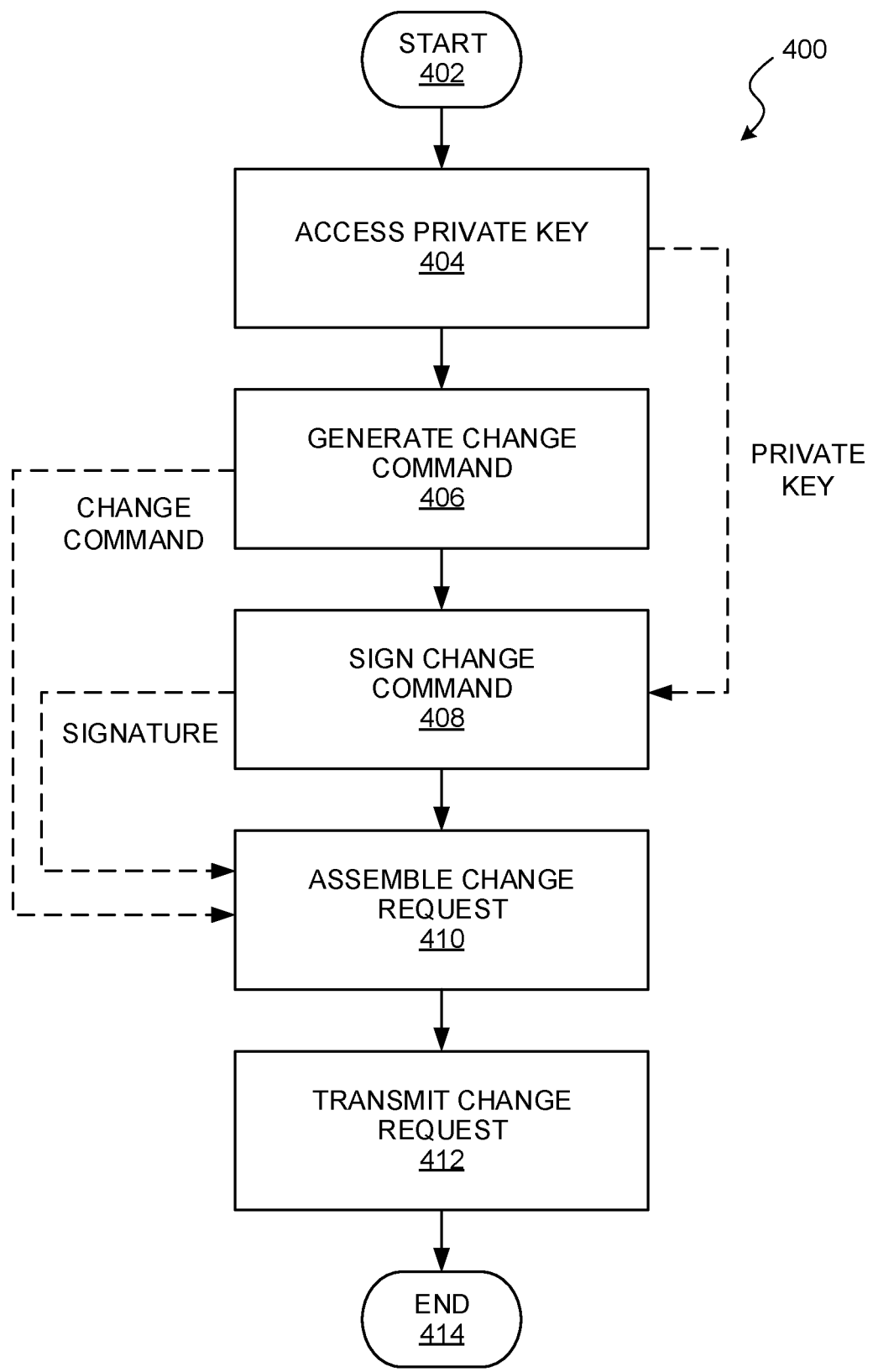
FIG. 4 is a flowchart of an example method to generate a change request to change a configuration setting of a target computing device.

FIG. 4 is a flowchart of an example method 400 to generate a change request to change a configuration setting of a target computing device. The method 400 may be performed by a device or system described herein, such as a computing device which is to generate change requests, including the remote entity 124 of FIG. 1 or other computing device controlled by an administrator. The method 400 may be embodied by a set of executable instructions that may be stored in a non-transitory computer-readable medium, and may be executed to cause a processor of a computing device to perform the method 400. The method 400 may be executed at startup of the target computing device. The method 400 begins at block 402.

At block 404, a private key from a plurality of private keys is accessed. The private key corresponds to a public key stored at the target computing device. A remote entity may access the private key.

At block 406, a change command to change a configuration setting of the target computing device is generated. The change command identifies the configuration setting to be changed and a value to which the configuration setting is to be set.

At block 408, the change command is signed using the private key to generate a signature. The change command may be signed at the remote entity.

At block 410, the change command and the signature are assembled into the change request. The change request may be assembled at the remote entity.

At block 412, the change request is transmitted to the target computing device. The change request may be transmitted by the remote entity. The target computing device may authenticate the change request using the public key, and if authenticated, apply the change request to change the configuration setting. The method is ended at block 414.

The method 400 may be repeated to generate a second change request. The second change request may be transmitted to the same target computing device, i.e., the first target computing device, or to a second target computing device. The second change request may be to change the same configuration setting, i.e., the first configuration setting, or a second configuration setting. The second change request is signed using a different private key, i.e., a second private key, the second private key corresponding to a different public key, i.e., a second public key. The second public key may be stored on the first target computing device if the second change request is sent to the first target computing device, or stored on the second target computing device if the second change request is sent to the second target computing device.

Figure 5:
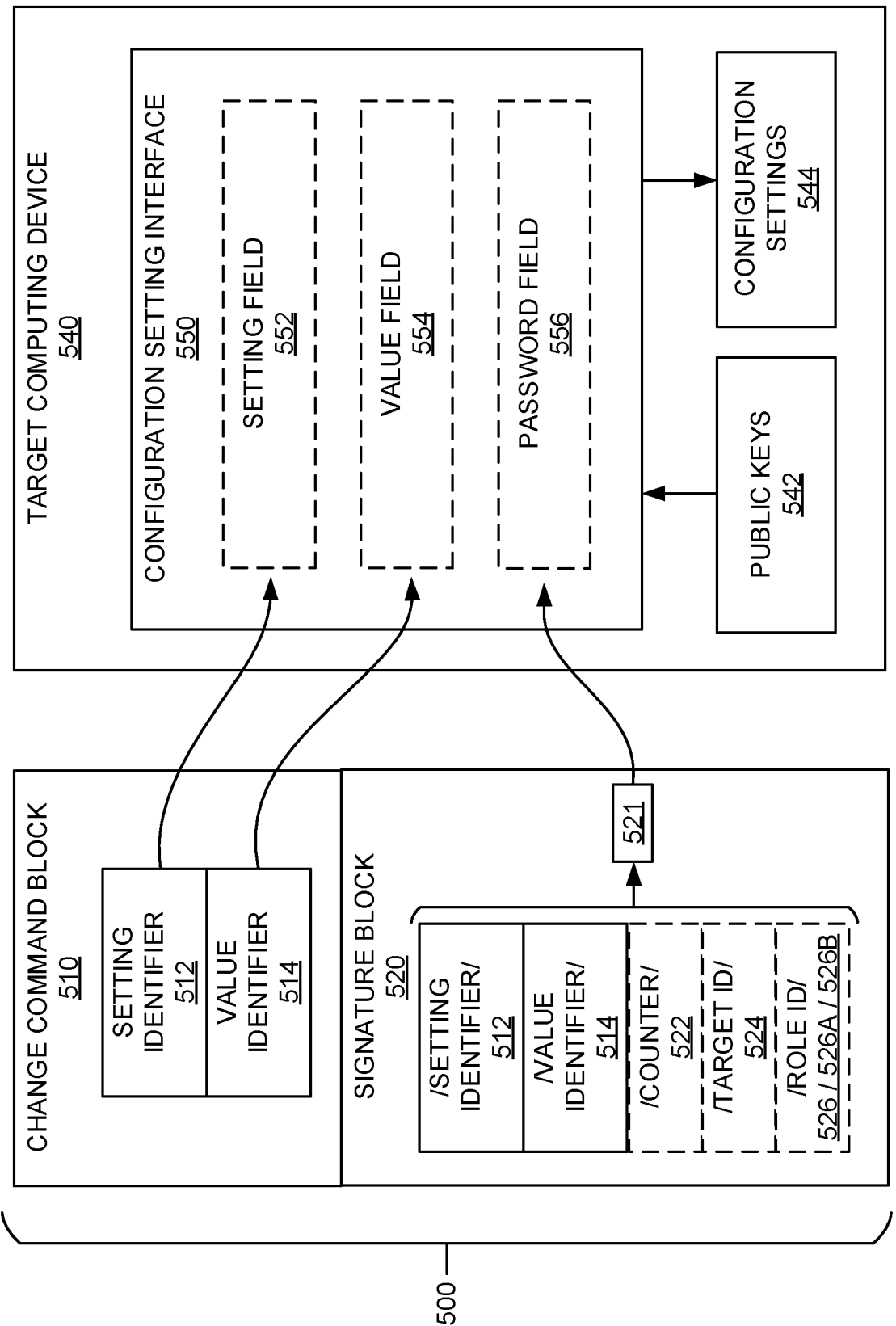
FIG. 5 is a schematic diagram of an example change request generated for submission to a target computing device.

FIG. 5 is a schematic diagram of an example change request 500 generated for submission to a target computing device 540 to change a configuration setting of the target computing device 540. The change request 500 is sent from a remote entity, and may be similar to the change request 122 of FIG. 1. Further, the target computing device 540 may be similar to the computing device 100 of FIG. 1.

The target computing device 540 includes configuration settings 544 changeable by change requests, and further includes public keys 542 to authenticate change requests. The target computing device 540 further includes a configuration setting interface 550 to read, authenticate, and apply change requests, such as the change request 500, to change a configuration setting of the configuration settings 544. The configuration setting interface 550 may be embodied by a set of executable instructions that may be stored in a non-transitory computer-readable medium. The configuration setting interface 550 may include the Windows® Management Instrumentation™ interface.

The change request 500 includes instructions and/or readable data interpretable by the configuration setting interface 550 to implement a change of configuration setting of the configuration settings 544. The change request 500 may be embodied by a set of executable instructions and/or readable data that may be stored in a non-transitory computer-readable medium.

The change request 500 includes a change command block 510 and a signature block 520. The change command block 510 includes a setting identifier 512 to identify the configuration setting to be changed, and a value identifier 514 to identify the value to which the configuration setting to be changed is to be set.

The signature block 520 includes a signature 521 derived from signing the change command block 510, i.e. from signing a combination of the setting identifier 512 and the value identifier 514. Further, in some examples, the signature 521 may be further derived from signing a counter 522, a target computing device identifier 524, an administrative role identifier 526, or a combination of such. These elements may provide further authentication of the change request 500, as described below.

The configuration setting interface 550 reads the change command block 510 for the setting identifier 512 and populates a setting field 552 accordingly. The configuration setting interface 550 further reads the change command block 510 for the value identifier 514 and populates a value field 554 accordingly. The configuration setting interface 550 further reads the signature block 520 for the signature 521 and populates a password field 556 accordingly. The setting identifier 512, value identifier 514, and signature may be readable as a string.

Having populated the setting field 552, value field 554, and password field 556, the change request 500 may be authenticated using a public key 542 stored on the target computing device 540. If authenticated, the change request 500 is applied. The change request 500 may be further authenticated by evaluation of the counter 522, the target computing device identifier 524, the administrative role identifier 526, or a combination of such.

In addition to authenticating the change request 500 using a public key 542, the change request 500 may be further authenticated by evaluation of the counter 522. The counter 522 may be incremented at a regular interval, such as, for example, with each submission of a change request 500 by a remote entity to a target computing device 540, or with each successful application of a change request 500 to a target computing device 540. The target computing device 540 may track the expected incrementation of the counter 522. The counter 522 on the change request 500 may then be evaluated by the target computing device 540 for comparison against an expected incrementation of the counter 522. If the counter 522 is greater than the last value seen by the target computing device 540, then the change request 500 may be allowed. Otherwise, the change request 500 may be considered to be an old intercepted change request 500 being used by a malicious actor, and the change request 500 may therefore be denied. Further, a counter 522 may be reset as appropriate, such as when a new public key 542 is provisioned to the target computing device 540, or if it is determined that a counter 522 has been removed or modified. Thus, incrementation and evaluation of the counter 522 may thereby inhibit an intercepted change request 500 from being manipulated for use against the target computing device 540.

In addition to authenticating the change request 500 using a public key 542, the change request 500 may be further authenticated by evaluation of the target computing device identifier 524 prior to application of the change request 500. The target computing device identifier 524 identifies the target computing device 540, thereby preventing the misapplication of a change request 500 by an unintended target computing device 540, and thereby preventing the reuse of an intercepted change request 500 against a different target computing device 540.

In addition to authenticating the change request 500 using a public key 542, the change request 500 may be further authenticated by evaluation of the administrative role identifier 526 prior to application of the change request 500. The administrative role identifier 526 identifies an administrative role of an issuer of the change request 500. Administrators may be permitted to change some configuration settings of the target computing device 540, while not being permitted to change others. The administrative role identifier 526 may be a reference number identifying a particular administrator, or may be an indicator of a particular security clearance level attained by the administrator who issued the change request 500. Only administrators having a particular level of authorization may change certain configuration settings. Thus, different configuration settings may only be configured when certain administrative role identifiers 526 are present in a change request 500. For example, a first change request 500 may include a first administrative role identifier 526A to identify a first administrative role of a first issuer of the first change request 500. A second change request 500 may include a second administrative role identifier 526B to identify a second administrative role of a second issuer of the second change request 500, the second administrative role identifier 526B being different from the first administrative role identifier 526A. The configuration setting interface 550 may evaluate the first administrative role identifier 526A to authenticate the first change request 500 and evaluate the second administrative role identifier 526B to authenticate the second change request 500. Thus, the remote management of configuration settings may be facilitated at the individual setting level and/or administrator level.

A change request 500 having a signature and having one or more of a counter 522, target computing device identifier 524, and an administrative role identifier 526, is thereby protected by layers of security in addition to public key cryptography, these layers of security being individually configurable to facilitate various schemes of remote management of the target computing device 540.

Figure 6:
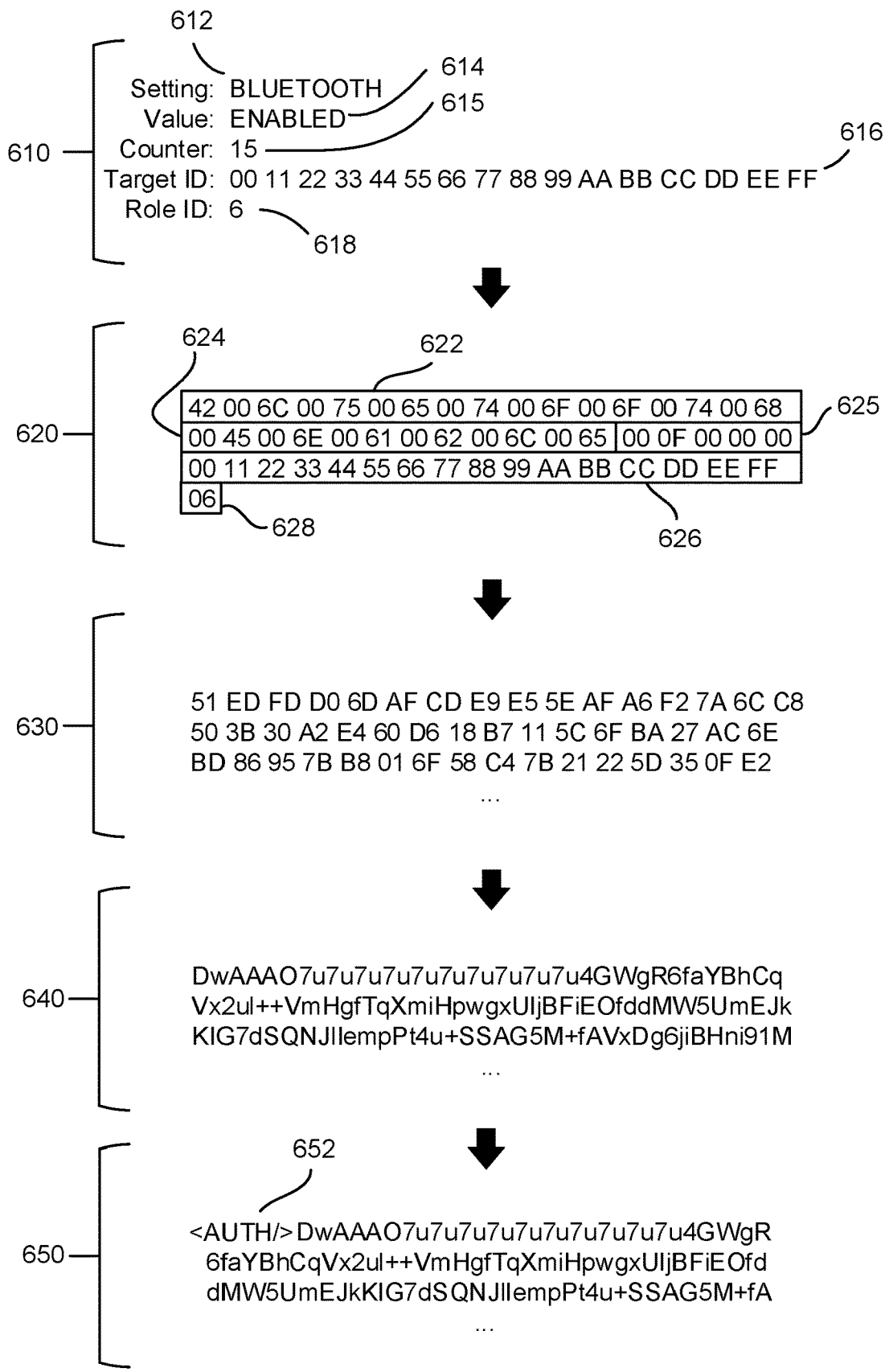
FIG. 6 is a schematic diagram that depicts the generation of an example signature password of an example change request.

FIG. 6 is a schematic diagram that depicts the generation of an example signature password 650 for an example change request. The change request may be similar to the change request 122 of FIG. 1, and thus is to request a change to a configuration setting of a target computing device.

Initially, a request 610 is input or received as plain text. The request 610 includes a setting identifier 612 (e.g. "BLUETOOTH"), a value identifier 614 (e.g. "ENABLED"), a counter 615 (e.g. "15"), a target computing device identifier 616 (e.g. "00 11 22 33 44 55 66 77 88 99 AA BB CC DD EE FF"), and an administrative role identifier 618 (e.g. "6"). The request 610 may be inputted or generated at an administrator computing device for transmission to a target computing device.

The setting identifier 612 and value identifier 614 may be string variables. The counter 615, target computing device identifier 616, and administrative role identifier 618 may be appropriately sized arrays of bytes.

The request 610 is represented in bytes as request 620. The request 620 thus includes setting identifier bytes 622, value identifier bytes 624, counter bytes 625, target computing device identifier bytes 626, and administrative role identifier bytes 628. These elements may be considered representations of the setting identifier 612, the value identifier 614, the counter 615, the target computing device identifier 616, and the administrative role identifier 618, respectively. Each of these elements may be appended one after the other in a string. These elements may conform to the Unicode standard for encoding.

The request 620 is signed using a private key corresponding to a public key stored on the target computing device to generate a signature 630. The signature 630 thus is derived from signing a representation of the setting identifier 612, the value identifier 614, the counter 615, the target computing device identifier 616, and the administrative role identifier 618. The signature 630 may be generated using an instruction such as, for example, "Signature=Sign((Setting.bytes+Value.bytes+Counter+Target/D+RoleID), Signing Key. Private)".

The signature 630 is encoded, along with the counter bytes 625, target computing device identifier bytes 626, and administrative role identifier bytes 628, prepended to the signature 630, to generate an encoded request 640, represented as a string. The encoded request 640 may be generated using an instruction such as, for example, "Base64EncodedAuthData=Base64Encode(Counter+Target/D+RoleID+Signature)".

The encoded request 640 is tagged with a password tag 652 to enable a configuration setting interface to recognize the encoded request 640 as a password. A tagged encoded request 640 may thus be referred to as a signature password 650. The signature password 650 may be inputted into a password field of a configuration setting interface, such as the password field 556 of the configuration setting interface 550 of FIG. 5. The signature password 650 may be generated using an instruction such as, for example, "Password="<AUTH/>"+Base64EncodedAuthData". The resulting signature password 650 may conform to any limits on the size of string types readable by a configuration setting interface.

Figure 7:
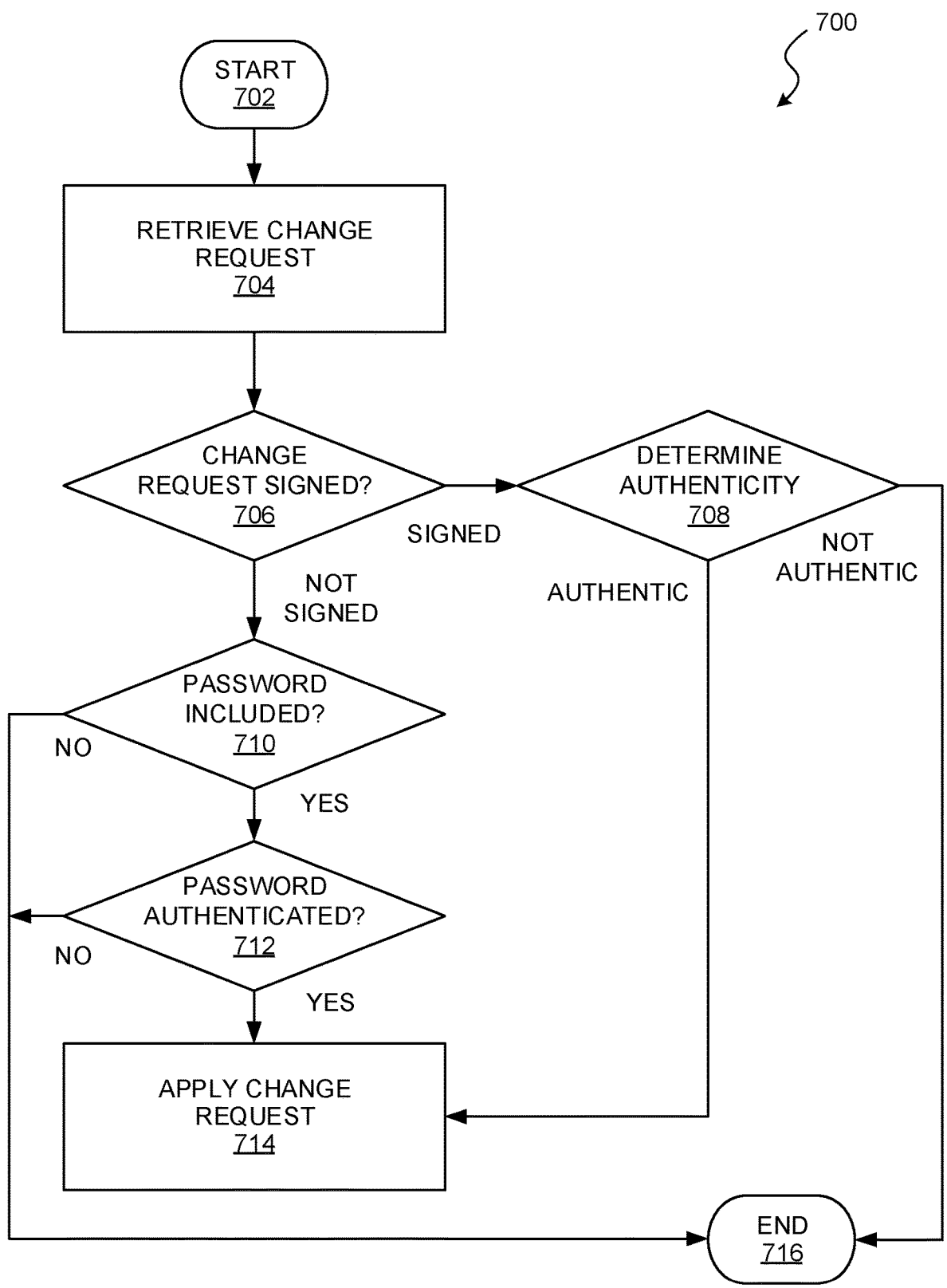
FIG. 7 is a flowchart of another example method to apply a change request sent by a remote entity to change a configuration setting of a target computing device.

FIG. 7 is a flowchart of an example method 700 to apply a change request sent by a remote entity to change a configuration setting of a target computing device. The method 700 may be performed by any of the devices and systems described herein. The method 700 may be embodied by a set of executable instructions that may be stored in a non-transitory computer-readable medium, and may be executed to cause a processor of a computing device to perform the method 700. The method 700 may be executed at startup of the target computing device. The method 700 begins at block 702.

At block 704, a change request is retrieved. The change request is to change a configuration setting of the target computing device. The change request includes a signature generated using a private key selected from a plurality of private keys.

At block 706, it is determined whether the change request is signed. For example, the change request may include a signature generated using a private key selected from a plurality of private keys, the private key corresponding to a public key stored on the target computing device. In other examples, the change request may be unsigned.

If it is determined that the change request is signed, authenticity of the change request is determined at block 708. The authenticity of the change request is determined using a public key corresponding to the private key used to sign the change request. The public key is stored on the target computing device. If the change request is determined to be not authentic, the method is ended at block 716. If the change request is determined to be authentic, the change request is applied at block 714. The change request changes a configuration setting of the target computing device.

If it is determined that the change request is not signed, it is determined whether the change request includes a password at block 710. If no password is included, the method is ended at block 716. If a password is included, it is determined whether the password authenticates the change request at block 712. For example, the password may match a password stored on the target computing device. Verification of the password may include de-hashing or otherwise decoding the password. A further condition for the password to authenticate the change request may be that the target computing device has a setting to accept passwords in lieu of signature passwords enabled.

If it is determined that the password authenticates the change request, the change request is applied at block 714. The change request changes a configuration setting of the target computing device.

In view of the above, it should be apparent that configuration settings of a target computing device may be remotely changed using change requests protected by public key cryptography. Each change request may make a single change to the configuration settings such that backward compatibility with configuration management systems is maintained. Further, each change request may be further protected by additional layers of security, including counters and identifiers, to prevent misuse of change requests, and to facilitate various schemes of remote management of computing devices.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
   a memory accessible at startup of the computing device, the memory to store (i) a configuration setting for the computing device, the configuration setting configurable by application of a change request, (ii) a first public key selected from a first plurality of public keys, and (iii) a second public key selected from a second plurality of public keys;
   a buffer in communication with the memory, the buffer to store a plurality of change requests submitted to the computing device by a remote entity, wherein each change request of the plurality of change requests includes a setting change for the configuration setting and a secure signature; and
   a processor in communication with the buffer and the memory, the processor to execute instructions to:
     retrieve, from the buffer, a first change request of the plurality of change requests,
     when the setting change of the first change request is in a first set of settings changeable by a change request including a secure signature generated with a private key from a first plurality of private keys,
     determine, with the first public key stored in memory, the secure signature included in the first change request was generated with a first private key that is from the first plurality of private keys and that corresponds to the first public key, and in response to determining secure signature included in the first change request was generated with the first private key, apply the setting change of the first change request to the configuration setting for the computing device, and when the setting change of the first change request is in a second set of settings changeable by a change request including a secure signature generated with a private key from a second plurality of private keys, determine, with the second public key stored in memory, that the secure signature included in the first change request was generated with a second private key that is from the second plurality of private keys and that corresponds to the first public key, and in response to determining that the secure signature included in the first change request was generated with the second private key, apply the setting change of the first change request to the configuration setting for the computing device.

2. The computing device of claim 1, wherein the first change request includes a change command block and a signature block, the change command block including a setting identifier to identify the configuration setting to be changed by the setting change of the first change request and a value identifier to identify a value to which the configuration setting is to be set, the signature block including the secure signature generated by signing of the change command block using the first private key.

3. The computing device of claim 2, wherein the signature block of the first change request is readable as a string, and the processor executes further instructions to use the signature block as a password to authenticate the first change request.

4. The computing device of claim 2, wherein the signature block includes a counter to be incremented with each submission of a change request by the remote entity, and wherein the processor is to execute further instructions to evaluate the counter to authenticate the first change request.

5. The computing device of claim 2, wherein the signature block of the first change request includes an administrative role identifier to identify an administrative role of an issuer of the first change request, and wherein the processor is to execute further instructions to evaluate the administrative role identifier to authenticate the first change request.

6. The computing device of claim 2, wherein the signature block of the first change request includes a target computing device identifier to identify the computing device, and wherein the processor is to execute further instructions to evaluate the target computing device identifier to authenticate the first change request.

7. The computing device of claim 1, wherein the processor is to execute further instructions to:

prior to determining the secure signature included in the first change request was generated with the first private key, detect that the first change request does not include the secure signature;

in response to detecting that the first change request does not include the secure signature, determine that the first change request includes a password to authenticate the first change request;

in response to determining that the first change request includes the password, determine that the password authenticates the first change request; and in response to determining that the password authenticates the first change request, apply the setting change of the first change request to the configuration setting for the computing device.

8. The computing device of claim 1, wherein the first private key and the second private key are securely stored remotely from the computing device and the remote entity at a centralized management server.

9. The computing device of claim 1, wherein the configuration setting comprises a firmware configuration setting.

10. A non-transitory computer-readable medium comprising instructions that when executed cause a processor of a computing device to:

receive a first change request from a first remote entity to change a first configuration setting for the computing device, the first change request including a signature generated using a first private key selected from a first plurality of private keys;

receive a second change request from a second remote entity to change a second configuration setting for the computing device, the second change request including a signature generated using a second private key selected from a second plurality of private keys;

identify a first public key with which to authenticate the first change request, the first public key identified from a plurality of public keys;

when the first configuration setting is in a first set of settings changeable by a change request including a signature generated with a private key from the first plurality of private keys, determine, with the first public key, that the signature included in the first change request was generated with the first private key;

in response to determining that the signature included in the first change request was generated with the first private key, apply the first change request to change the first configuration setting for the computing device;

identify a second public key with which to authenticate the second change request, the second public key identified from the plurality of public keys;

when the second configuration setting is in a second set of settings changeable by a change request including a signature generated with a private key from the second plurality of private keys, determine, with the second public key, that the signature included in the second change request was generated with the second private key; and in response to determining that the signature included in the second change request was generated with the second private key, apply the second change request to change the second configuration setting for the computing device.

11. The non-transitory computer-readable medium of claim 10, wherein:

the first change request includes a first administrative role identifier to identify a first administrative role of a first issuer of the first change request;

the second change request includes a second administrative role identifier to identify a second administrative role of a second issuer of the second change request, the second administrative role identifier different from the first administrative role identifier; and the non-transitory computer readable medium further comprises instructions that when executed cause the processor of the computing device to:

evaluate the first administrative role identifier to authenticate the first change request; and evaluate the second administrative role identifier to authenticate the second change request.

12. The non-transitory computer-readable medium of claim 10, further comprising instructions that when executed cause the processor of the computing device to:
identify a counter in the signature of the first change request; and
prior to applying the first change request to change the first configuration setting of the computing device, evaluate the counter to authenticate the first change request.

\* \* \* \* \*